May 2, 1967     A. J. DREMEL     3,317,764
RECIPROCATING TYPE ELECTRIC TOOL
Filed May 21, 1964
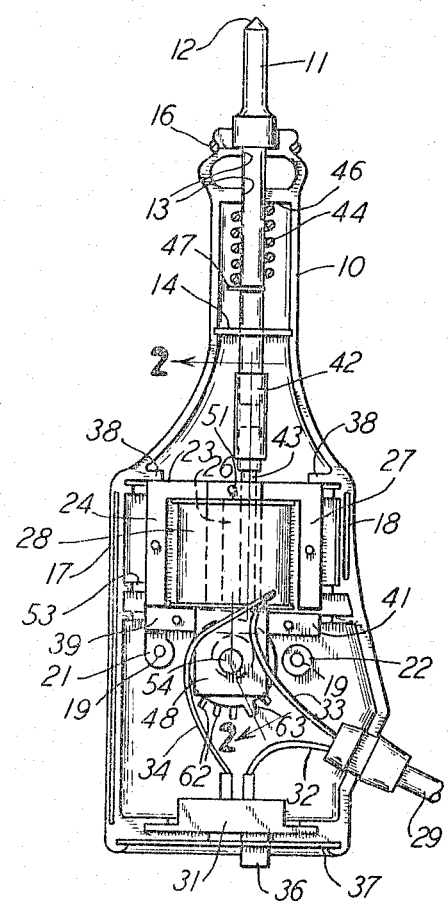
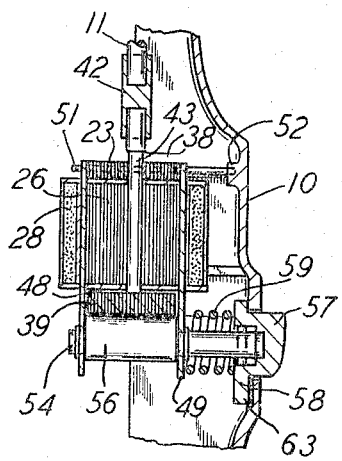
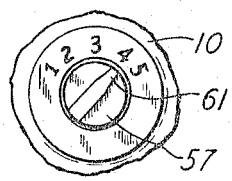
INVENTOR:
ALBERT J. DREMEL
BY: *Arthur J. Hansmann*
    ATTORNEY

United States Patent Office 3,317,764
Patented May 2, 1967

---

3,317,764
RECIPROCATING TYPE ELECTRIC TOOL
Albert J. Dremel, Racine, Wis., assignor to Dremel Manufacturing Company, Racine, Wis., a corporation of Wisconsin
Filed May 21, 1964, Ser. No. 369,069
6 Claims. (Cl. 310—17)

This invention relates to an electric tool, and more particularly, it relates to a reciprocating type of hand manipulated electric tool.

It is a general object of this invention to provide a reciprocating type of electric tool which is an improvement over the tools known heretofore, that is relatively compact and inexpensive but yet sturdy in its construction, and it is of course also extremely effective in the performance of its function of reciprocating the working member of the tool.

Another object of this invention is to accomplish the aforementioned objectives and to do so with a tool which is adjustable in the length of stroke or reciprocation and with the adjustable members being readily accesible and easily set in a plurality of selective positions to control the length of stroke of the working member.

Still another object of this invention is to provide an electric tool which can be readily manufactured and assembled with a minimum of effort and without tools. In accomplishing this particular object, the tool is designed and constructed so that the various parts can be placed within the housing by hand and can be secured therein even under spring pressures intended for the working parts but yet the springs do not dislodge the assembled tool parts prior to the complete assembly of the tool housing.

Still another object of this invention is to provide an electric vibrating type of tool which is constructed to withstand the effects of continuous vibrations in the use of the tool, and which accomplishes this particular objective without elaborate means or treatment of the tool such as varnishing of the coil windings since the tool is arranged to withstand the stress of the vibrations.

Still another object of this invention is to provide a vibrating tool of the electric type wherein the electric power is utilized to the fullest to provide maximum effectiveness in the power or vibrations produced by the tool.

Other objects and advantages become apparent upon reading the following description in light of the accompanying drawing wherein:

FIG. 1 is a plan view of a preferred embodiment of a tool of this invention with one-half of the housing removed to display the interior of the tool.

FIG. 2 is a sectional view taken along the line 2—2 of FIG. 1.

FIG. 3 is a view of a fragment of the exterior of the tool showing the control thereof.

The tool is shown to consist of the housing half 10 and the working member 11 which is mounted in the housing 10 to reciprocate along the axis of the member 11 for the well-known purpose of providing the working point 12 in an extended position with respect to the housing for engraving or the like function of this type of reciprocating tool. It will therefore be understood that half of the housing is removed and the remaining half is shown, and all of the interior working parts are shown in FIG. 1. The working member 11 extends axially of the housing 10 and is guided therein by openings 13 formed in the housing 10, and also a support plate 14 is disposed within the housing for axial reciprocation of the member 11. It will further be noted that a snap ring 16 extends around the end of the housing 10 to hold the housing half together at that end. Also grooves 17 and 18 are shown in the housing and these of course would receive the tongues of the unshown housing half, and screw holes 19 are provided on bosses 21 and 22 to secure the two housing halves together in an obvious and well-known manner.

A laminated magnetic core 23 of an E shape is disposed within the housing, and the core legs 24, 26, and 27 are included in the core 23. Also a winding of wire and insulation indicated at 28 is disposed within the core 23 as shown, and the usual electrical connections are made to the winding 28. In this instance, the extension cord 29 is connected to the housing 10 with one lead going to a switch 31 and the other lead going to the coil 28, and these are leads 32 and 33, respectively. Another wire lead 34 extends from the switch 31 to the coil 28 and thus the switch button 36 controls the electric current going to the tool in the usual manner. In this instance a mounting plate 37 is secured to the housing 10 and has a central opening for the extension of the switch button 36 therethrough and thus the buton 36 is slidable for operation of the switch 31, all in a conventional and well-known manner.

The core 23 is shown to abut housing shoulders 38, and a laminated plate or member 39 is disposed on the other side of the core 23 between the latter and the boss 21 at one end of the member 39, and this end is to be known as the pivotal axis end of the member 39. That is, the member 39 is relatively fixed between the core 23 and the boss 21, and thus the opposite end designated 41 of the member 39 is free to reciprocate or pivot toward and away from the free ends of the legs 24, 26, and 27 of the core 23.

The working member 11 extends through a non-conductive sleeve 42 which is made of nylon or the like, and the member 11 has a reduced end 43 which extends through the core 23 and abuts the member 39. It will therefore be understood that upon the usual and well known energizing of the electric power means including the core 23 and a winding 28, the member 39 will pivotally reciprocate toward and away from the core 23, and this will of course reciprocate the working member 11 which is abutably connected to the member 39. Also, a compression coil spring 44 is disposed between the housing shoulder 46 and a snap pin 47 on the member 11. The spring 44 therefore constantly urges the member 11 into abutment with the member 39, toward the end 41.

FIGS. 1 and 2 show that a pair of plates 48 and 49 extend through the electric power means above and below the member 39 respectively. A mounting pin 51 extends between the plates 48 and 49 and on into the housing in a boss 52 in the housing. The pin 51 therefore of course supports the electric power means in the housing along with the support provided by the shoulders 38 and ribs such as the rib 53 extending in the interior of the housing 10. FIG. 2 therefore shows the mounting of the power means in the housing and it will be noted that this is in the nature of a floating type mounting in that there is no firm connection to the housing except the connection provided by the pin 51 which is simply pressed into the opening in the housing boss 52. This of course permits easy assembly of the electrical means in the housing in that the core 23 and winding 28 would be preassembled and simply pressed into the housing in the manner shown. Also significant is the fact that the electrical means is floating so that the stress of operating the tool will not injure the electrical means and this is significant.

The brackets or plates 48 and 49 extend beyond the plate member 39, and they rotatably receive a cam shaft 54 which has its eccentric or cam portion 56 between the plates. This portion 56 is therefore available for abutting the member 39 and therefore the length of stroke of the working member 11 is controlled by the rotation of the cam shaft 54. A control knob 57 extends from the interior to the exterior of the housing 10, and an interior flange 58 secures the knob to the housing by means of a compression spring 59 disposed between the plates 49 and the housing 10. Thus the knob 57 and cam shaft 54 of course rotate together so that upon rotating the knob 57 the adjustment of the cam shaft 54 is readily achieved. FIG. 3 shows the arrangement, and the housing 10 also has numbers 1 through 5 shown thereon, and these of course indicate the settings of the knob 57 in its rotated position as shown by the knob pointer 61.

At this point it will now also be understood that the spring 59 resiliently supports the electrical means in the housing, and the spring also assists in the assembly of the tool in that it somewhat cocks the electrical means within the housing against the pin 51 as the tool is being assembled. The pin 51 is therefore retained in the boss 52 since it cannot come out in the cocked position created by the spring 59.

Also, the housing 10 has notches 62, and the knob flange 58 has a projection 63 which sets in the notches 62 so that the knob 57 will therefore be secured in any set position under the urging of the spring 59. The cam shaft 54 is of course therefore extending transverse to the direction of pivotal movement of the member 39, and such pivotal movement or throw is therefore readily controlled by the shaft 54 as set by the knob 57.

While a specific embodiment of this invention has been shown and described, it should be obvious that certain changes could be made in the embodiment and the invention should therefore be determined only by the scope of the appended claims.

What is claimed is:

1. A hand-manipulated electric-actuated tool of the reciprocating stroke type comprising a housing, electric power means disposed within said housing for producing a magnetic field according to the alternating current applied to said electric means, a magnetically attracted member movably mounted in said housing adjacent said electric means within the attractive force of the latter and being reciprocable toward and away from the latter, a spring operatively connected to said member for urging said member away from said electric means, a working member operatively connected to said member to reciprocate with the latter and being supported on said housing, mounting means connected to said electric means and being in abutment with said housing, a cam rotatably mounted on said mounting means with the axis thereof extending across said attracted member to the side thereof opposite said electric means for selectively limiting the movement of said attracted member away from said electric means under the urging of said spring according to the rotated position of said cam for controlling the stroke of said working member, a shaft extending from said cam, a selector knob attached to said shaft and being rotatable on said housing for rotating said cam and being disposed exteriorly of said housing, an additional compression coil spring on said shaft intermediate said knob and said mounting means for resiliently mounting said electric means in said housing, and indicator means on said housing and said knob for indicating the rotated position of said knob and said cam.

2. A hand-manipulated electric-actuated tool of the reciprocating stroke type comprising a housing, an electric coil disposed within said housing for producing a magnetic field in response to the alternating current applied to said electric coil, a magnetically attracted plate pivotally mounted in said housing on an axis adjacent one edge of said electric coil and disposed within the magnetic force of the latter and being pivotal toward and away from the latter, a spring operatively associated with said plate for pivotally urging said plate away from said electric coil, a working member operatively associated with said plate to reciprocate with the pivotal movement of the latter and being supported on said housing, a mounting member attached to said electric coil and extending therebeyond and being attached to said housing for mounting said electric coil in said housing, a cam rotatably mounted on the extending portion of said mounting member with the axis of said cam being parallel to said axis of pivot of said plate and with said cam extending across said plate on the side thereof opposite said electric coil for selectively limiting the pivotal movement of said plate away from said electric coil under the urging of said spring according to the rotated position of said cam for controlling the stroke of said working member, and a selector knob attached to said cam for rotating the latter and being disposed exteriorly of said housing.

3. A hand-manipulated electric-actuated tool of the reciprocating stroke type comprising a housing, electric means disposed within said housing for producing a magnetic field in response to the alternating current applied to said electric means, locating means operatively connected between said housing and said electric means for locating the latter in said housing, a bracket connected to said electric means and extending therefrom in the direction along the line of magnetic force and having a circular opening in the extending portion thereof with the axis of said opening spaced from said electric means, a cam rotatably disposed in said opening and spaced from said electric means, a magnetically attracted member movably mounted in said housing intermediate said cam and said electric means within the magnetic force of said electric means and being reciprocable toward and away from said electric means, a spring operatively associated with said member for urging said member away from said electric means, a working member operatively associated with said attracted member to reciprocate with the latter and having an extension extending through the center of said electric means and being supported on said housing and extending therefrom, a selector knob attached to said cam for rotating the latter and being disposed exteriorly of said housing, and indicator means on said housing and said knob for indicating the rotated position of said knob and said cam.

4. A hand-manipulated electric-actuated tool of the reciprocating stroke type comprising a housing having two openings therein, an electric coil disposed within said housing for producing a magnetic field in response to the alternating current applied to said electric coil, a magnetically attracted plate movably mounted in said housing adjacent said electric coil within the magnetic force of the latter and being reciprocable toward and away from the latter, a working member operatively abutting said plate to reciprocate with the latter and being supported on said housing and extending therefrom through one of said two openings, a spring disposed intermediate said working member and said housing for urging said working member toward said plate in the direction of the latter's movement away from said electric coil, a cam rotatably mounted on said housing with the axis thereof extending across said plate to the side thereof opposite said electric coil for selectively limiting the movement of said plate away from said electric coil under the urging of said spring according to the rotated position of said cam for controlling the stroke of said working member, a selector knob keyed to said cam for rotating the latter and having a flange on the interior of said housing surrounding the other of said openings for retaining said knob in said housing and with said flange and said housing having notch and projection means therebetween and with said knob extending through said other of said openings and having a pointer thereon, a scale on said housing adjacent said pointer for indicating the rotated position of said knob and said cam, and a spring operative on said knob for urging the latter outwardly of said housing into engagement of said notch and projection means.

5. A hand-manipulated electric-actuated tool of the reciprocating stroke type comprising a housing, an electric coil disposed within said housing for producing a magnetic field in response to the alternating current applied to said electric coil, a magnetically attracted plate pivotally mounted in said housing on an axis through one end of said plate adjacent one side of said electric coil and disposed within the magnetic force of the latter and being pivotal toward and away from the latter, a working member supported on said housing and having a connection extending through the center of said electric coil and abutting said plate intermediate the length of the latter to reciprocate with said plate, a spring in said housing for urging said plate away from said electric coil, and adjustment means in said housing and extending to the side of said plate opposite said electric coil and on the axis of reciprocation of said working member for selectively limiting the movement of said plate away from said electric coil under the urging of said spring.

6. A hand-manipulated electric-actuated tool of the reciprocating stroke type comprising a housing, electric means disposed within said housing for producing a magnetic field according to the alternating current applied to said electric means, a magnetically attracted member movably mounted in said housing adjacent said electric means within the attractive force of the latter and being reciprocable toward and away from the latter, a spring operatively connected to said attracted member for urging said attracted member away from said electric means, a working member operatively connected to said attracted member to reciprocate with the latter and being supported on said housing, adjustable abutment means on said housing adjacent said attracted member on the side thereof opposite said electric means for limiting the movement of said attracted member away from said electric means under the urging of said spring, mounting means connected to said electric means and extending into abutment with said housing at one side of said electric means, and an additional spring operatively disposed between said housing and said mounting means on the side of said electric means opposite said one side for resiliently securing said electric means in said housing.

References Cited by the Examiner
UNITED STATES PATENTS

| | | | |
|---|---|---|---|
| 1,659,698 | 2/1928 | Norstrom | 310—29 |
| 2,228,676 | 1/1941 | Renga | 310—19 X |
| 2,346,474 | 4/1944 | De La Torre | 310—17 X |
| 2,480,451 | 8/1949 | De La Torre | 310—29 X |
| 2,565,697 | 8/1951 | Odstrcil | 310—29 |
| 2,753,898 | 7/1956 | MacFarland | 310—29 X |
| 2,876,537 | 3/1959 | Bates | 310—29 X |

MILTON O. HIRSHFIELD, *Primary Examiner.*

D. F. DUGGAN, *Assistant Examiner.*